(12) United States Patent
Doerbecker

(10) Patent No.: US 10,013,229 B2
(45) Date of Patent: Jul. 3, 2018

(54) SIGNAL SYNCHRONIZATION AND LATENCY JITTER COMPENSATION FOR AUDIO TRANSMISSION SYSTEMS

(71) Applicant: Intel Corporation, Santa Clara, CA (US)

(72) Inventor: Matthias Doerbecker, Ettlingen (DE)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 14/700,481

(22) Filed: Apr. 30, 2015

(65) Prior Publication Data

US 2016/0321028 A1    Nov. 3, 2016

(51) Int. Cl.
| | | |
|---|---|---|
| *G06F 17/00* | (2006.01) | |
| *G06F 3/16* | (2006.01) | |
| *G11B 20/10* | (2006.01) | |

(52) U.S. Cl.
CPC ........ *G06F 3/162* (2013.01); *G11B 20/10527* (2013.01); *G11B 2020/1074* (2013.01); *G11B 2020/10546* (2013.01)

(58) Field of Classification Search
CPC .............. G06F 3/165; G06F 17/3074; G11B 20/10527; G11B 2020/10638; G11B 2020/10666; G11B 2020/10703; G11B 2020/10694; G11B 2020/1074; G11B 2020/10805; G11B 2020/10814
See application file for complete search history.

(56) References Cited

U.S. PATENT DOCUMENTS

| | | | |
|---|---|---|---|
| 2002/0034374 A1 | 3/2002 | Barton et al. | |
| 2003/0043856 A1 | 3/2003 | Lakaniemi et al. | |
| 2003/0198255 A1 | 10/2003 | Sullivan et al. | |
| 2004/0114607 A1* | 6/2004 | Shay | H04L 65/80 370/395.42 |
| 2006/0184261 A1* | 8/2006 | Ng | G06F 3/16 700/94 |
| 2010/0235486 A1* | 9/2010 | White | H04L 43/0858 709/223 |
| 2014/0173136 A1 | 6/2014 | Hazelet | |
| 2015/0036695 A1 | 2/2015 | Gowda et al. | |

OTHER PUBLICATIONS

International Search Report and Written Opinion for International Patent Application No. 01.P82007PCT) dated Aug. 1, 2016, 13 pages.
International Preliminary Report on Patentability dated Nov. 9, 2017 for PCT Patent Application No. PCT/US16/21263.

* cited by examiner

*Primary Examiner* — Fan Tsang
*Assistant Examiner* — David Siegel
(74) *Attorney, Agent, or Firm* — Green, Howard & Mughal LLP

(57) ABSTRACT

Techniques related to input and output signal synchronization and latency jitter compensation for audio systems are discussed. Such techniques may include determining a number of virtually buffered samples based on a detected latency between an audio capture thread and an audio playback thread and synchronizing an audio input signal and an audio output signal based on the number of virtually buffered samples.

25 Claims, 10 Drawing Sheets

SIGNAL SYNCHRONIZATION AND LATENCY JITTER COMPENSATION FOR AUDIO TRANSMISSION SYSTEMS

BACKGROUND

In audio transmission system contexts, synchronization between an input audio signal and an output audio signal may be desirable or even necessary for performing a variety of audio processing tasks such as echo compensation, active noise cancellation, or the like. For example, an input audio signal and an output audio signal may be synchronized when there is a well defined latency between the input audio signal and the output audio signal.

However, current audio transmission systems may not provide such synchronization due to a variety of factors such as inconsistent synchronization between input drivers and output drivers in systems that operate associated capture devices and playback devices on the same audio clock, difficulty in compensating for jitter in asynchronous sample rate conversions in systems that operate capture devices and playback devices on different audio clocks, and the like.

It may be desirable to efficiently synchronize input audio signals and output audio signals in audio transmission system contexts. It is with respect to these and other considerations that the present improvements have been needed. Such improvements may become critical as the desire to provide high quality image processing and computer visions becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
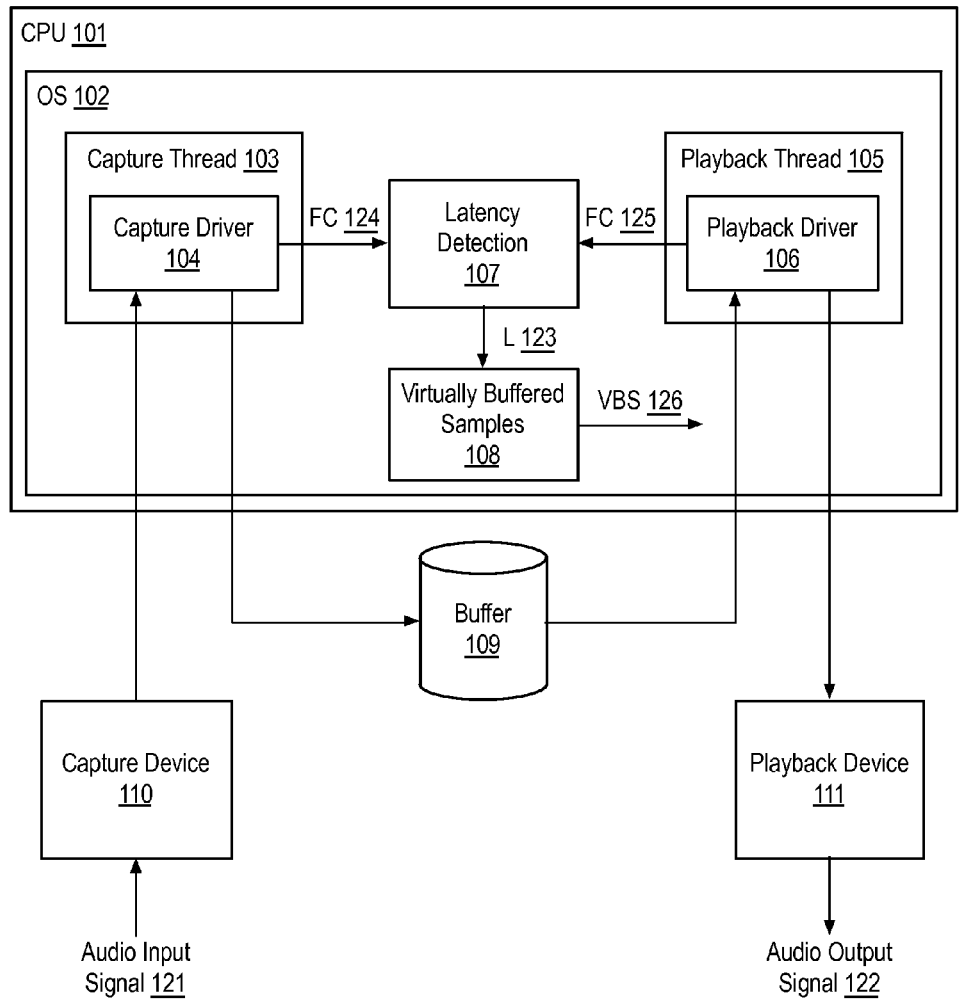
FIG. 1 illustrates an example audio system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as audio devices, multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, systems, and articles are described herein related to synchronizing input audio signals and output audio signals.

As described above, in audio transmission system contexts, it may be desirable to synchronize input audio signals and output audio signals. For example, the audio transmission system may be a block-based multi-threaded audio transmission system. In some embodiments discussed herein, performing synchronization for an audio system may include detecting a latency between an audio capture thread and an audio playback thread. For example, the latency may be detected based on comparing time stamps of capture thread function calls and playback thread function calls. Based on the latency (e.g., measured or detected latency), a number of virtually buffered audio samples may be determined. For example, the number of virtually buffered audio samples may correspond to a sample rate times the latency and may be characterized as virtual as no actual (e.g., physical) buffered audio samples are associated with the latency. Based on the determined virtually buffered audio samples, an audio input signal and an audio output signal may be synchronized.

For example, in audio transmission systems having a capture device (e.g., a sound card or the like) and a playback device (e.g., an Ethernet transmitter or the like) that operate based on the same audio clock, synchronizing the input and output signals may include initializing a capture driver associated with the capture device and a playback driver associated with the playback device, determining the number of virtually buffered audio samples after such initialization, and initializing a buffer associated with the capture driver and the playback driver based on the number of virtually buffered audio samples such that the input and output signals have a target, predetermined, or nominal latency therebetween. For example, the target latency and the shared audio clock may provide a known, well defined, and consistent latency between the input and output signals.

In other examples, the audio transmission system may have a capture device and a playback device that operate based on independent audio clocks and the system may include an asynchronous sample rate converter to implement a conversion ratio controlled via a closed loop controller. In such examples, the closed loop controller may sample a buffer level from a buffer associated with a capture driver and a playback driver and the number of virtually buffered audio samples and the closed loop controller may generate the conversion ratio based on the number of physical samples in the buffer and the number of virtually buffered audio samples. Such sampling of both the number of physical samples and the number of virtual samples may provide for less noise in the input of the closed loop controller and more accurate and robust conversion ratios over time.

FIG. 1 illustrates an example audio system 100, arranged in accordance with at least some implementations of the present disclosure. As shown in FIG. 1, audio system 100 may include a central processing unit (CPU) 101 that may implement an operating system (OS) 102, a capture thread 103, a capture driver 104, a playback thread 105, a playback driver 106, a latency detection module 107, and a virtually buffered samples module 108. For example, operating system 102 may implement capture thread 103, playback thread 105, latency detection module 107, and virtually buffered samples module 108. Audio system 100 may include any suitable audio system such as an automotive audio platform, an audio platform, an audio transmission system, an audio architecture, or the like. For example, audio system 100 may implement a block-based multi-threaded audio transmission system. In some examples, OS 102 may be characterized as a block-based multi-threaded audio transmission OS. For example, audio system 100 may block-based such that it processes blocks of audio data such as pulse code modulation (PCM) audio data. For example, a block of audio data may be made up of samples, which may be made up of data words, which may be made up of data bits.

Also as shown, capture thread 103 may implement capture driver 104 and playback thread 105 may implement playback driver 106. Also as shown, system 100 may include a capture device 110 and a playback device that may operate under the control of capture driver 104 and playback driver 106, respectively, and a buffer 109. Buffer 109 may include any suitable buffer such as a ring buffer, a first in, first out (FIFO) buffer, or the like. As shown, in some examples, buffer 109 may be implemented outside of CPU 101. In other examples, buffer 109 may be implemented by CPU 101. For example, buffer 109 may include memory and logic circuitry for implementing a ring buffer, a FIFO buffer, or the like.

Furthermore, as shown, capture device 110 may receive an audio input signal 121. Audio input signal 121 may be any suitable input signal such as an analog or digital input signal from an audio capture source such as a microphone (and associated circuitry) or the like. Capture device 110 may include any suitable capture device such as a hardware captured device or the like. For example, capture device 110 may be a sound card or the like. Capture device 110, CPU 101, and playback device may process audio input signal 121 and audio system 100 may provide an audio output signal 122 via playback device 122. Audio output signal 122 may be any suitable output signal such as an analog or digital output signal. Audio output signal 122 may be provided to any audio output device such as a speaker (and associated circuitry) or the like. Playback device 111 may include any suitable playback device such as a hardware playback device or the like. For example, playback device 111 may be an Ethernet transmitter or the like. For example, capture device 110 and playback device 111 may be implemented as two independent hardware devices that are serviced by two independent drivers (e.g., capture driver 104 and playback driver 106, respectively). As discussed with respect to audio systems 300 and 600, capture device 110 and playback device 111 may be driven by a common audio clock or by separate audio clocks.

As discussed, audio system 100 may be a block-based system. For example, capture driver 104 and playback driver 106 may operate in a block-based manner (e.g., capture driver 104 may provide blocks of PCM audio samples or the like and playback driver 106 may consume blocks of PCM audio samples or the like). The length of a block may be characterized as a period of time. As shown in FIG. 1, an interface between capture driver 104 and playback driver 106 may be provided via buffer 109.

As shown in FIG. 1, system 100 may include a latency detection module 107, which may detect or measure a latency (L) 123 between the execution of capture thread 103 and the execution of playback thread 105. Latency detection module 107 may detect latency 123 between the execution of capture thread 103 and the execution of playback thread 105 using any suitable technique or techniques. For example, latency detection module 107 may compare a capture thread function call (FC) 124 and a playback thread function call (FC) 125 to detect latency 123 between the execution of capture thread 103 and the execution of playback thread 105. For example, latency 123 may be measured or detected as the time difference between a capture thread timestamp for a capture thread function call and a playback thread timestamp for a playback thread function call following the capture thread function call. For example, latency 123 may be the time interval between the execution of a capture thread and the execution of a playback thread in a multi-threaded audio transmission system.

Figure 2:
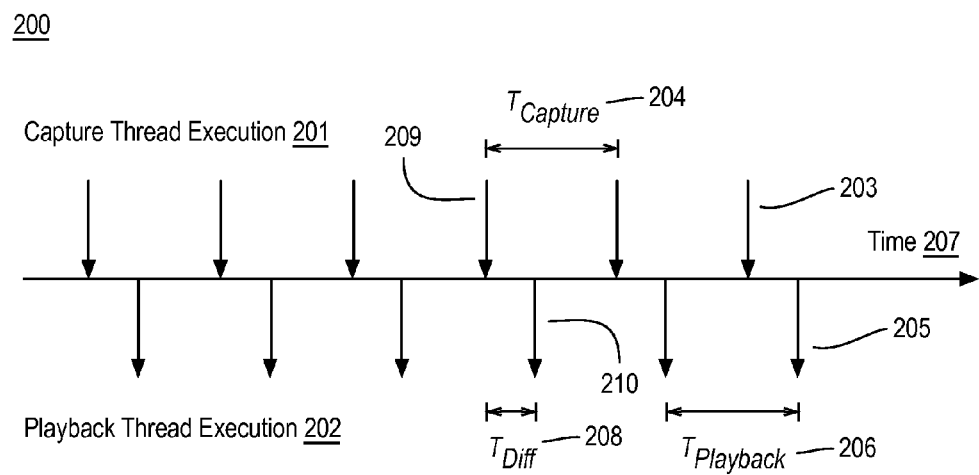
FIG. 2 illustrates an example timing diagram for an example capture thread execution and an example playback thread execution.

FIG. 2 illustrates an example timing diagram 200 for an example capture thread execution 201 and an example playback thread execution 202, arranged in accordance with at least some implementations of the present disclosure. As shown in FIG. 2, capture thread execution 201 may include capture operations 203 having a timing between them of capture time ($T_{Capture}$) 204 and playback thread execution 202 may include playback operations 205 having a timing between them of playback time ($T_{Playback}$) 206. For example, as time 207 progresses, capture thread execution 201 may perform capture operations 203 at a capture rate of $1/T_{Capture}$ and playback thread execution 202 may perform playback operations 205 at a playback rate of $1/T_{Playback}$. In some examples, the capture rate and the playback rate may be associated with a sample rate. For example, the sample rate ($f_s$) may be equal to an integer multiple of the capture rate or equal to an integer multiple of the playback rate or both. The sample rate may be any suitable sample rate for audio applications, such as 32000 Hz, 44100 Hz, 48000 Hz, or the like. The capture rate may be chosen such that each capture operation transfers an integer number of samples, $N_{Capture}$, corresponding to a period $T_{Capture}=N_{Capture}/f_s$. The playback rate may be chosen such that each playback operation transfers an integer number of samples, $N_{Playback}$, corresponding to a period $T_{Playback}=N_{Playback}/f_s$. For example, for a sample rate of 48000 Hz, the capture thread and the playback thread may operate on blocks of 192 samples such that the capture rate and the playback rate may be 250 Hz (e.g., 48000 Hz/192).

As shown, a latency ($T_{Diff}$) 208 between capture operations 203 and playback operations 205 may be provided as a time difference between a particular capture operation 209 and an immediately subsequent playback operation 210. For example, latency 208 may be the interval between capture operation 209 and playback operation 210. As discussed, latency 208 may be determined using any suitable technique or techniques such as determining a difference between a time stamp associated with capture operation 209 (e.g., a time stamp for a function call associated with capture operation 209) and a time stamp associated with playback operation 210 (e.g., a time stamp for a function call associated with capture operation 210). For example, latency 208 may be determined based on the time of a capture operation and the time of an immediately subsequent playback operation.

Returning to FIG. 1, as shown, latency detection module 107 may provide latency 123 to virtually buffered samples module 108. Latency 123 may include any suitable data such as a time duration associated with a latency, a plurality of time durations associated with multiple latencies, or a median time duration for multiple latencies, or the like. For example, latency detection module 107 may generate and provide such time durations or a median time duration or the like. For example, the median time duration may be based on about 15 latency samples or the like. Virtually buffered samples module 108 may receive latency 123 and virtually buffered samples module 108 may generate a number of virtually buffered samples (VBS) 126 based on latency 123. Virtually buffered samples module 108 may generate number of virtually buffered samples 126 using any suitable technique or techniques. For example, number of virtually buffered samples 126 may be based on latency 123 and a sample rate ($f_s$) implemented via audio system 100.

As discussed, virtually buffered samples module 108 may generate number of virtually buffered samples 126 using any suitable technique or techniques. In some examples, number of virtually buffered samples 126 may be generated based on latency 123 and the sample rate such as by multiplying the sample rate and latency 123 as shown in Equation (1):

$$N_{virtually\ buffered\ samples}=f_s \cdot T_{Diff} \quad (1)$$

where $N_{virtually\ buffered\ samples}$ may be the number of virtually buffered samples, $f_s$ may be the sample rate, and $T_{Diff}$ may be the latency.

Figure 3:
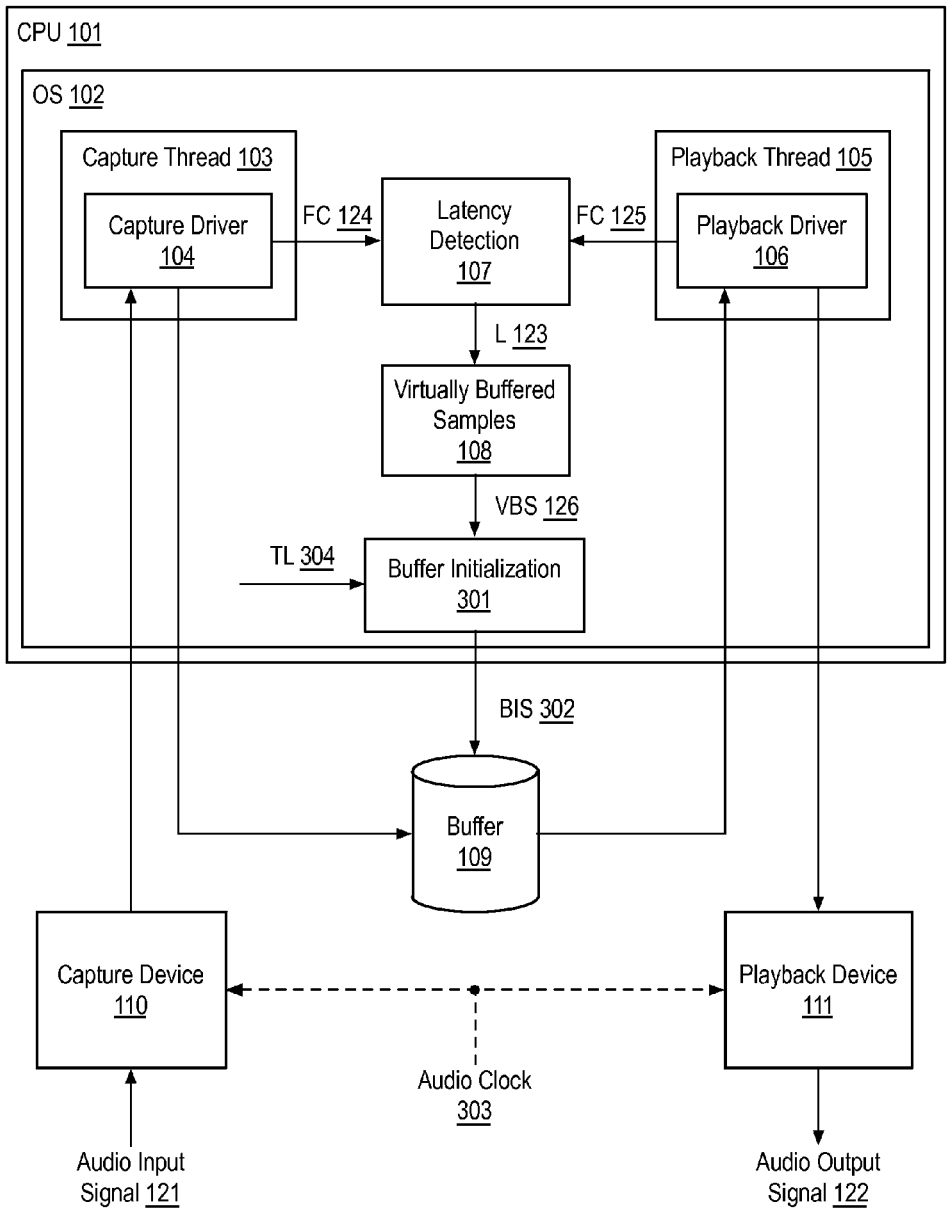
FIG. 3 illustrates an example audio system having a shared audio clock.

FIG. 3 illustrates an example audio system 300 having a shared audio clock 303, arranged in accordance with at least some implementations of the present disclosure. As shown in FIG. 3, audio system 300 may include central processing unit (CPU) 101 that may implement operating system (OS) 102, capture thread 103, capture driver 104, playback thread 105, playback driver 106, latency detection module 107, virtually buffered samples module 108, and a buffer initialization module 301. Furthermore, audio system 300 may include capture device 110 that may receive audio input signal 121, playback device 111 that may provide audio output signal 122, and buffer 109. For example, CPU 101, OS 102, capture thread 103, capture driver 104, playback thread 105, playback driver 106, latency detection module 107, virtually buffered samples module 108, capture device 110, audio input signal 121, playback device 111, audio output signal 122, and buffer 109 may include any suitable characteristics and may perform any operations as discussed with respect to audio system 100 and such details will not be repeated for the sake of brevity.

As also shown in FIG. 3, audio system 300 may implement or receive audio clock 303. As shown, audio clock 303 may be provided to both capture device 110 and playback device 111. For example, audio clock 303 may provide a common audio clock to capture device 110 and playback device 111. In some examples, audio clock 303 may be used to clock or implement capture and playback operations as discussed herein. For example, audio clock 303 may provide synchronization of capture device 110 and playback device 111 such that audio system 300 may be characterized as a synchronous audio system or the like. For example, capture device 110 and playback device 111 may operate in the same time domain as established by audio clock 303. However, as shown, capture device 110 may be serviced by capture driver 104 and playback device 111 may be serviced by playback driver 106 such that capture device 110 and playback device 111 may be serviced by independent drivers. Furthermore, capture driver 104 and playback driver may not provide strict synchronization for audio input signal 121 and audio output signal 122.

As is discussed further herein, synchronization between audio input signal 121 and audio output signal 122 may be provided via buffer initialization signal 302. For example, after boot-up of audio system 300, capture driver 104 and playback driver 106 may be initialized or started. After such initialization, latency detection module 107 may detect latency 123 and provide latency 123 to virtually buffered samples module 108, which may determine number of virtually buffered samples 126. Buffer initialization module 301 may determine buffer initialization signal 301 for the initialization of buffer 109. For example, buffer initialization signal 302 may indicate a number of physically buffered samples based on number of virtually buffered samples 126 and a target latency 304 that may be provided to buffer 109 at initialization. Such physically buffered samples may be inserted as zero-valued samples or as skipping samples or the like. Such physically buffered samples may be muted in audio output signal 122 for example. Such physically buffered samples may provide, at initialization of audio system 300, a known and well defined latency (e.g., a selected or predetermined target latency 304) between audio input signal 121 and audio output signal 122. For example, tuning to target latency 304 and operation based on audio clock 303 may provide audio system 300 with a well defined synchronization between audio input signal 121 and audio output signal 122.

Figure 4:
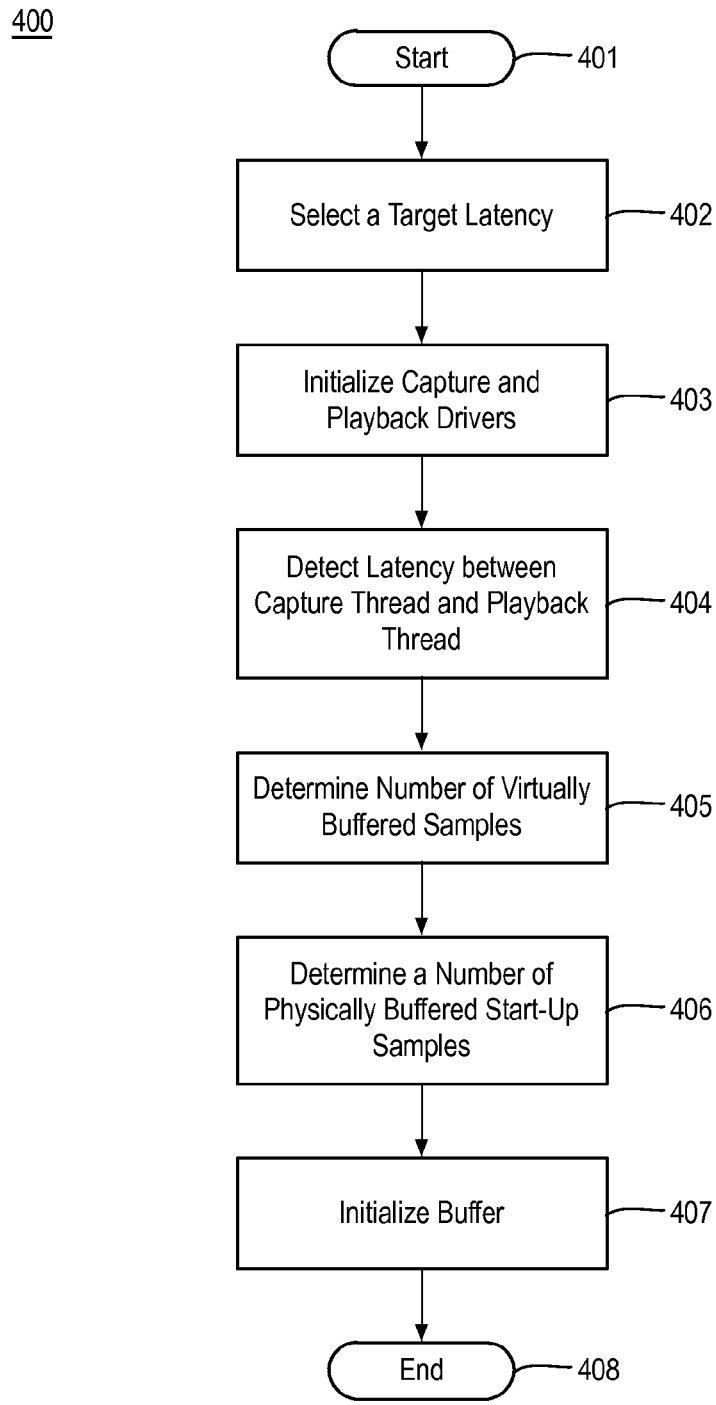
FIG. 4 illustrates an example process for performing synchronization for an audio system.

FIG. 4 illustrates an example process 400 for performing synchronization for an audio system, arranged in accordance with at least some implementations of the present disclosure. Process 400 may include one or more operations 401-408 as illustrated in FIG. 4. Process 400 may be performed by an audio system (e.g., audio system 300 or any other devices or systems discussed herein) or portions of process 400 may be performed by a system to perform audio signal synchronization and/or jitter compensation. Process 400 or portions thereof may be repeated for any audio system start-ups, resets, or the like.

As shown, process 400 may begin from start operation 401 at operation 402, "Select a Target Latency", where a target latency may be selected. For example, the target latency may be a target latency between an input audio signal and an output audio signal. Such a target latency may be characterized as a nominal latency, a selected latency, a predetermined latency, or the like. Such a target latency may be selected using any suitable technique or techniques. For example, the target latency may be predetermined and set for an audio system, selected by a user, generated based on a capture time or rate, a playback time or rate, a sample rate, or the like. For example, with reference to audio system 300, target latency 304 may be determined by operating system 102 and may be provided to buffer initialization module 301 as shown.

In some examples, the target or nominal latency may be determined based on a capture time (e.g., an inverse of a capture rate) implemented via capture thread. For example, the target or nominal latency may the capture time increased by a nominal latency factor as shown in Equation (2):

$$T_{nominal} = LF \cdot T_{Capture} \quad (2)$$

where LF may be the latency factor, $T_{nominal}$ may be the nominal or target latency, and $T_{Capture}$ may be the capture time. The latency factor may be any suitable factor such as a value in the range of about 2 to 3 or the like. In some examples, the latency factor may be 2.5.

For example, the nominal latency may be selected such that it is large enough to include one time period (e.g., one capture time ($T_{Capture}$) 204, please refer to FIG. 2) for a series to parallel conversion at the capture thread and a parallel to series conversion at the playback thread that may be needed for block-based audio processing and the maximum measured start-up latency (e.g., latency ($T_{Diff}$) 208, determined at operation 405), which is also one time period (e.g., the maximum latency is one time period). For example, as is discussed further, the unknown start-up latency may be corrected to a known latency using the techniques of process 400. In such examples, the latency factor may have a minimum value of 2. However, such nominal latency may be susceptible to jitter or the like and the latency factor (and nominal latency) may be chosen to reduce such jitter. For example, a latency factor of 2.5 may be advantageous for providing time for data conversion, compensation for the maximum measured start-up latency, and jitter reduction. For example, if the sample rate of the audio system is 48000 Hz and each capture operation transfers $N_{Capture}$=192 samples, such that the capture time or time period is 4 ms, a latency factor of 2.5 may provide a nominal latency of 10 ms. Such a nominal latency may provide a data conversion time of 4 ms (e.g., 1 period), compensation for up to a 4 ms measured start-up latency, and a nominal remaining latency of 2 ms, which may provide a latency that is halfway offset with respect to the period (e.g., of 4 ms) and therefore highly jitter resistant.

As discussed, the nominal latency may be any suitable value such as the exemplary 10 ms for a 4 ms period system. Also, as discussed, the nominal latency may be known by the system and therefor a target latency for the operation of the audio system. For example, a buffer of the audio system may be initialized to convert an unknown but measured latency (e.g., the measured start-up latency) to a known latency (e.g., the target latency). Such an initialization process may provide a well defined and robust latency between the input and output audio signal that may be used by system 100 to implement various audio processing such as echo compensation, active noise cancellation, or the like.

Process 400 may continue at operation 403, "Initialize Capture and Playback Drivers", where a capture driver and a playback driver may be initialized. For example, with reference to FIG. 3, audio system 300 may, after a boot-up of audio system 300 for example, initialize or start capture driver 104 and playback driver 106. Audio system 300 may initialize capture driver 104 and playback driver 106 using any suitable technique or techniques. For example, the initialization of capture driver 104 and playback driver 106 may provide an unknown (and therefore undesirable) latency between capture operations and playback operations. With reference to FIG. 2, for example, after initialization of capture driver 104 and playback driver 106, capture thread execution 201 and playback thread execution may have an unknown latency ($T_{Diff}$) 208 therebetween.

Returning to FIG. 4, process 400 may continue at operation 404, "Detect Latency between Capture Thread and Playback Thread", where a latency may be detected between the capture thread and the playback thread. For example, the latency may be characterized as a start-up latency, a detected start-up latency, a measured start-up latency, or the like. The latency may be detected and/or measured using any suitable technique or techniques. For example, with reference to FIG. 3, latency detection module 107 may detect the latency (e.g., latency 123) using any techniques discussed therewith. The latency may be a single latency measurement, a median of multiple latency measurements, or the like. Referring to FIG. 2, the latency (e.g., the detected start-up latency or the like) may be latency ($T_{Diff}$) 208 such that the latency may be the interval between capture operation and playback operation 210.

Returning to FIG. 4, process 400 may continue at operation 405, "Determine Number of Virtually Buffered Samples", where a number of virtually buffered samples may be determined based on the latency detected and/or measured at operation 404 using any suitable technique or techniques. For example, the number of virtually buffered samples may be the latency multiplied by a sample rate of the audio system as shown with respect to Equation (1). For example, with reference to FIG. 3, virtually buffered samples module 108 may generate the number of virtually buffered samples (e.g., number of virtually buffered samples 126) using any techniques discussed therewith. As discussed, the number of virtually buffered samples may be characterized as virtual as no actually buffered audio samples are associated with the latency.

Returning to FIG. 4, process 400 may continue at operation 406, "Determine a Number of Physically Buffered Start-Up Samples", where a number of physically buffered start-up samples may be determined based on the number of virtually buffered samples using any suitable technique or techniques. For example, the number of physically buffered start-up samples may represent a number of buffered samples that may be provided on initialization of a buffer to move or convert the measured (e.g., unknown and undesirable) start-up latency detected at operation 404 to the target latency selected at operation 402. The number of physically buffered start-up samples may be determined using any suitable technique or techniques. For example, with reference to FIG. 3, buffer initialization module 301 may generate the number of physically buffered start-up samples based on number of virtually buffered samples 126 and target latency 304 and buffer initialization module 301 may provide the number of physically buffered start-up samples as part of buffer initialization signal 302.

As discussed, the number of physically buffered start-up samples may be determined (e.g., via buffer initialization module 301 or the like) using any suitable technique or techniques. For example, a number of overall samples associated with the target latency determined at operation 402 may be determined as shown in Equation (3) and the number of physically buffered start-up samples may be determined as shown in Equation (4):

$$N_{overall\ samples} = T_{nominal\ latency} \cdot f_s \quad (3)$$

$$N_{physically\ buffered\ samples} = N_{overall\ samples} - N_{virtually\ buffered\ samples} \quad (4)$$

where $N_{overall\ samples}$ may be the number of overall samples (e.g., a number of overall samples needed to initialize a buffer to provide a desired nominal latency), $T_{nominal\ latency}$ may be nominal or target latency (e.g., as determined at operation 402), $f_s$ may be the sample rate, $N_{physically\ buffered\ samples}$ may be the number of physically buffered start-up samples (e.g., a number of samples to physically buffer to bring the signal latency to the nominal or target latency), and $N_{virtually\ buffered\ samples}$ may be the number of virtually buffered samples determined at operation 405.

For example, operation 406 as implemented via buffer initialization module 301 may determine a number of samples to physically store in a buffer at initialization to move the latency from the measured or detected latency (and associated with the number of virtually buffered samples) to the target latency (and associated with the number of overall samples). As shown, such a number of samples to physically store may be the difference between the number of virtually buffered samples and the number of overall samples.

Process 400 may continue at operation 407, "Initialize Buffer", where a buffer of the audio system may be initialized. For example, with reference to FIG. 3, buffer initialization module 301 may provide buffer initialization signal 302 to buffer 109 for initialization. As discussed, buffer initialization signal 302 may include a number of physically buffered start-up samples to store in buffer 109 at initialization. Such samples may be processed and may thereby provide an additional latency or lag to move the latency from the measured latency (e.g., latency 123) to the target latency (e.g., target latency 304). Such samples may include any suitable data such as zero-valued samples, skipping samples, random data-valued samples, or the like. Furthermore, buffer initialization signal 302 may include a buffer initialization or start signal. For example, buffer 109 (e.g., a ring buffer, FIFO buffer, or the like) may buffer data associated with the number of physically buffered start-up samples and initialize or start based on receiving buffer initialization signal 302.

Returning to FIG. 4, as shown, process 400 may end at end operation 407. For example, process 400 may provide a start up or initialization process for an audio system such that, subsequent to process 400, the audio system may operate with audio input signal 121 and audio output signal 122 being synchronized and having a known latency therebetween. Process 400 may be performed at start up of the audio system or reset of the audio system or the like. For example, process 400 may provide for latency compensation by measuring the latency between a capture thread and an execution thread after the system has booted and process 400 may provide active compensation for undesirable unknown latency between input and output signals.

Figure 5:
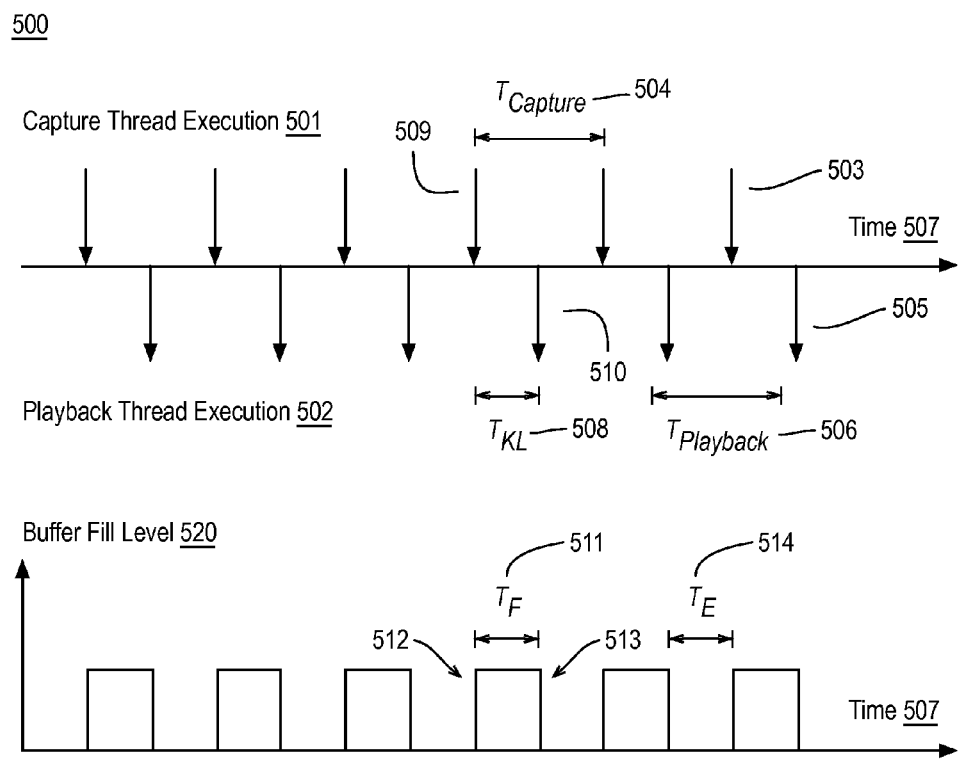
FIG. 5 illustrates an example timing diagram for an example capture thread execution and an example playback thread execution.

FIG. 5 illustrates an example timing diagram 500 for an example capture thread execution 501 and an example playback thread execution 502, arranged in accordance with at least some implementations of the present disclosure. For example, timing diagram 500 may illustrate capture thread execution 501, playback thread execution 502, and a buffer fill level 520 after performing process 400. As shown in FIG. 5, capture thread execution 501 may include capture operations 503 having a timing between them of capture time ($T_{Capture}$) 504 and playback thread execution 502 may include playback operations 505 having a timing between them of playback time ($T_{Playback}$) 506. For example, as time 507 progresses, capture thread execution 501 may perform capture operations 503 at a capture rate of $1/T_{Capture}$ and playback thread execution 502 may perform playback operations 505 at a playback rate of $1/T_{Playback}$. In some examples, the capture rate and the playback rate may be associated with a sample rate. For example, the sample rate ($f_s$) may be equal to an integer multiple of the capture rate or an integer multiple of the playback rate or both. The sample rate may be any suitable sample rate for audio applications, such as 32000 Hz, 44100 Hz, 48000 Hz, or the like. The capture rate may be chosen such that each capture operation transfers an integer number of samples, $N_{Capture}$, corresponding to a period $T_{Capture} = N_{Capture}/f_s$. The playback rate may be chosen such that each playback operation transfers an integer number of samples, $N_{Playback}$, corresponding to a period $T_{Playback} = N_{Playback}/f_s$.

As shown, a known latency ($T_{KL}$) 508 between capture operations 503 and playback operations 505 may be generated as discussed with respect to process 400 such that known latency 508 may be a time difference between a particular capture operation 509 and an immediately subsequent playback operation 510. For example, known latency 508 may be the interval between capture operation 509 and playback operation 510 as well as the interval between any capture operation of capture operations 503 and an immediately subsequent playback operation of playback operations 505. As discussed, known latency 508 may be used to initialize a buffer with physically buffer samples at initialization such that the number of physically buffered samples may be based on a number of overall buffered samples (e.g., associated with a nominal or target latency) and a number of virtually buffered samples (e.g., associated with a detected latency between capture thread execution 501 and playback thread execution 502 at start-up). In some examples, the number of physically buffered samples, which are used to initialize the buffer, may be selected pursuant to Equation (4), i.e., according to the difference between the number of overall buffered samples (e.g., associated with a nominal or target latency) and the number of virtually buffered samples (e.g., associated with a detected latency between capture thread execution 501 and playback thread execution 502 at start-up).

FIG. 5 also illustrates buffer fill level 520 over time 507. As shown, buffer fill level 520 may be a particular value (e.g., one or more) during filled duration ($T_F$) 511 and buffer fill level 520 may be zero or the like during empty duration ($T_F$) 514. For example, a buffer (e.g., buffer 109 or the like) may be loaded or filled or the like at capture operations 503 and emptied or used or the like at playback operations 505. For example at a buffer load operation 512, the buffer may be filled such that buffer load operation 512 is associated with capture operation 509 and, at a buffer read operation 513, the buffer may be read and emptied such that buffer read operation 513 may be associated with playback operation 510.

Figure 6:
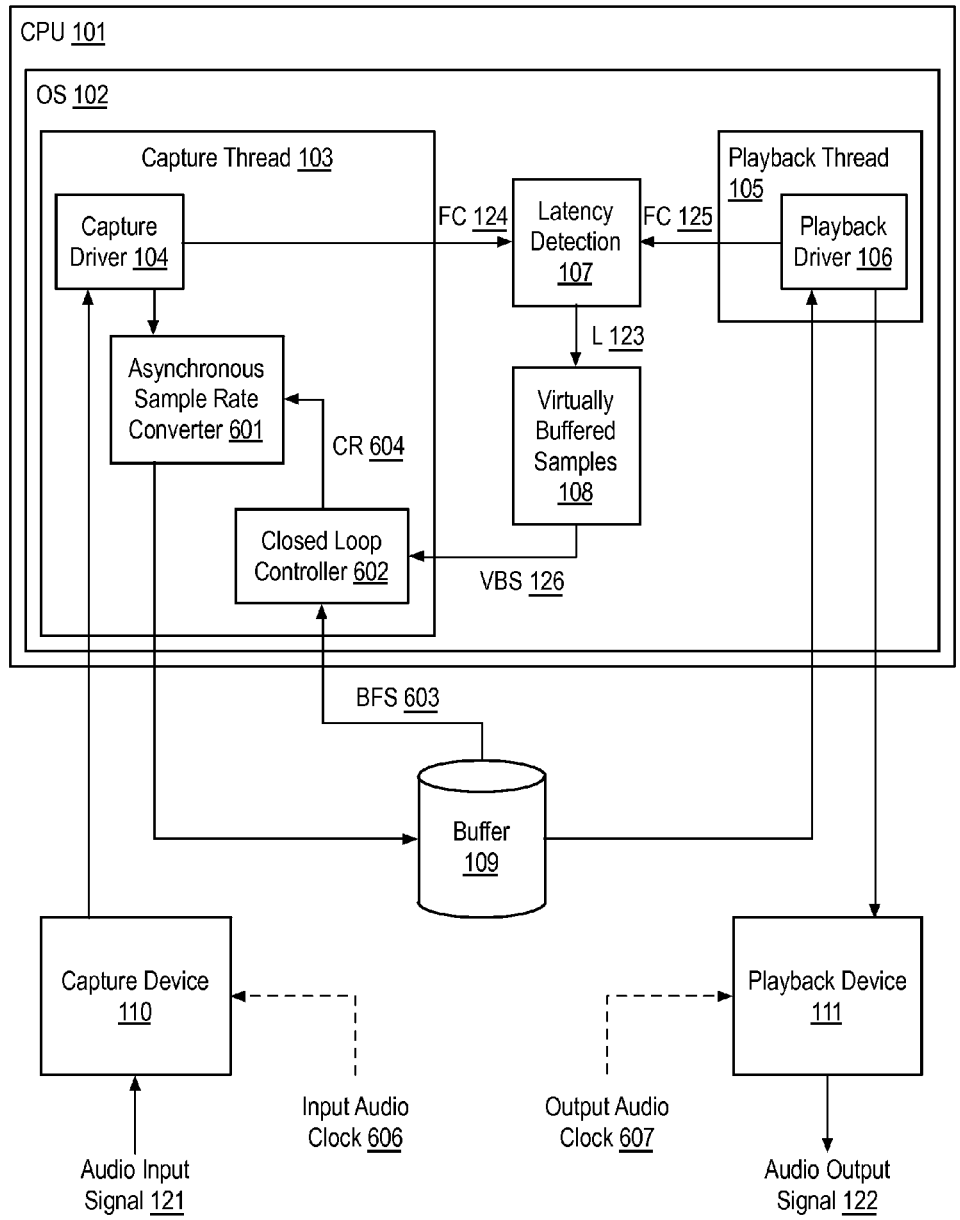
FIG. 6 illustrates an example audio system having independent audio clocks.

FIG. 6 illustrates an example audio system 600 having independent audio clocks, arranged in accordance with at least some implementations of the present disclosure. As shown in FIG. 6, audio system 600 may include central processing unit (CPU) 101 that may implement operating system (OS) 102, capture thread 103, capture driver 104, playback thread 105, playback driver 106, latency detection module 107, virtually buffered samples module 108, an asynchronous sample rate converter 601, and a closed loop controller 602. For example, asynchronous sample rate converter 601 and closed loop controller 602 may be implemented as part of capture thread 103. Furthermore, audio system 600 may include capture device 110 that may receive audio input signal 121, playback device 111 that may provide audio output signal 122, and buffer 109. For example, CPU 101, OS 102, capture thread 103, capture driver 104, playback thread 105, playback driver 106, latency detection module 107, virtually buffered samples module 108, capture device 110, audio input signal 121, playback device 111, audio output signal 122, and buffer 109 may include any suitable characteristics and may perform any operations as discussed with respect to audio system 100 and such details will not be repeated for the sake of brevity.

As also shown in FIG. 6, audio system 600 may implement or receive an input audio clock 606 and an output audio clock 607. As shown, input audio clock 606 may be provided to capture device 110 and output audio clock 607 may be provided to playback device 111. For example, input audio clock 606 and output audio clock 607 may be driven by independent crystals or the like. Furthermore, a clock skew may exist between input audio clock 606 and output audio clock 607 such that audio input signal 121 and audio output signal 122 may be asynchronous.

For example, to compensate for such a clock skew (e.g., between the clock domain of input audio clock 606 and the clock domain of output audio clock 607), audio system 600 may implement asynchronous sample rate converter 601 and closed loop controller 602. For example, closed loop controller 602 may sample the buffer fill of buffer 109 via buffer fill signal 603 and closed loop controller 602 may receive number of virtually buffered samples 126. Based on buffer fill signal 603 and number of virtually buffered samples 126, closed loop controller 602 may generate a conversion ratio 604. For example, conversion ratio 604 may be based on a sum of number of virtually buffered samples 126 and a number of physically buffered samples determined based on buffer fill signal 603. For example, the sum may be compared to a previous sum, a previous median of multiple sums, a target sum, or the like and conversion ratio 604 may be generated based on the comparison or deviation. Closed loop controller 602 may generate conversion ratio 604 using any suitable technique or techniques such as applying filtering techniques to transform the sum of number of virtually buffered samples 126 and the number of physically buffered samples determined based on buffer fill signal 603 to conversion 604. For example, closed loop controller 602 may implement proportional-integral-derivate control techniques or the like based on the sum of number of virtually buffered samples 126 and the number of physically buffered samples determined based on buffer fill signal 603.

As shown, closed loop controller 602 may provide conversion ratio 604 to asynchronous sample rate converter 601. Asynchronous sample rate converter 601 may receive conversion ratio 604 and asynchronous sample rate converter 601 may compensate for the associated clock skew based on conversion ratio 604 by adapting its interpolation/decimation ratio. For example, if a sum of number of virtually buffered samples 126 and the number of physically buffered samples determined based on buffer fill signal 603 is greater than a target sum or the like, asynchronous sample rate converter 601 may decrease the number of output samples that are generated for each block (or period) of input samples. Correspondingly, if the sum is less than the target sum or the like, asynchronous sample rate converter 601 may increase the number of output samples that are generated for each block (or period) of input samples.

Based on control via the sum of number of virtually buffered samples 126 and the number of physically buffered samples determined based on buffer fill signal 603 (e.g., in contrast to just monitoring buffer fill signal 603), system 600 may provide more robust synchronization of audio input signal 121 and audio output signal 122 free of wow and flutter artifacts particularly when a latency between capture thread execution and playback thread execution is approximately the same as the capture period of the capture thread execution, which may provide large swings in the number of physically buffered samples. Such examples are discussed further herein with respect to FIG. 8.

As is discussed further herein, synchronization between audio input signal 121 and audio output signal 122 may be provided via closed loop controller 602 generating conversion ratio 604 based on number of virtually buffered samples 126 and buffer fill signal 603. For example, closed loop controller 602 may sum number of virtually buffered samples 126 and the number of physically buffered samples determined based on buffer fill signal 603 and closed loop controller 602 may generate conversion ratio 604 based on the sum.

Figure 7:
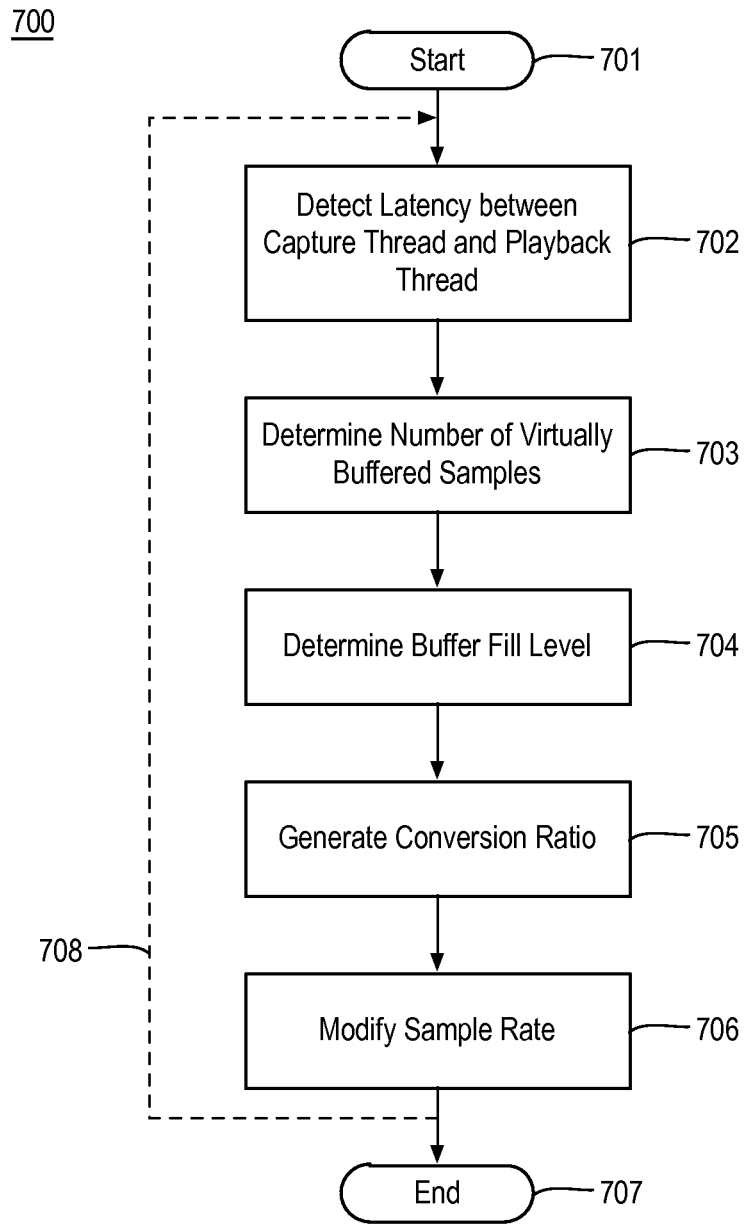
FIG. 7 illustrates an example process for performing synchronization for an audio system.

FIG. 7 illustrates an example process 700 for performing synchronization for an audio system, arranged in accordance with at least some implementations of the present disclosure. Process 700 may include one or more operations 701-707 as illustrated in FIG. 7. Process 700 may be performed by an audio system (e.g., audio system 600 or any other devices or systems discussed herein) or portions of process 700 may be performed by a system to perform audio signal synchronization and/or jitter compensation. Process 700 or portions thereof may be repeated substantially continuously to provide synchronization and/or jitter compensation for an audio system having a capture device and a playback device serviced by independent clock signals, for example.

As shown, process 700 may begin from start operation 701 at operation 702, "Detect Latency between Capture Thread and Playback Thread", where a latency may be detected between a capture thread and a playback thread. For example, the latency may be characterized as a measured latency, a detected start-up latency, a monitored latency, or the like. The latency may be detected and/or measured using any suitable technique or techniques. For example, with reference to FIG. 6, latency detection module 107 may detect the latency (e.g., latency 123) using any techniques discussed therewith. The latency may be a single latency measurement, a median of multiple latency measurements, or the like. Referring to FIG. 2, the latency (e.g., the detected latency or the like) may be latency ($T_{Diff}$) 208 such that the latency may be the interval between capture operation 209 and playback operation 210.

Returning to FIG. 7, process 700 may continue at operation 703, "Determine Number of Virtually Buffered Samples", where a number of virtually buffered samples may be determined based on the latency detected and/or measured at operation 702 using any suitable technique or techniques. For example, the number of virtually buffered samples may be the latency multiplied by a sample rate of the audio system as shown with respect to Equation (1). For example, with reference to FIG. 6, virtually buffered samples module 108 may generate the number of virtually buffered samples (e.g., number of virtually buffered samples 126) using any techniques discussed therewith. As discussed, the number of virtually buffered samples may be characterized as virtual as no actually buffered audio samples are associated with the latency.

Process 700 may continue at operation 704, "Determine Buffer Fill Level", where a buffer fill level and/or a number of physically buffered samples may be determined. The buffer fill level and/or a number of physically buffered samples may be determined using any suitable technique or techniques. For example, the buffer fill level and/or a number of physically buffered samples may be determined by accessing a buffer such as a ring buffer or a FIFO buffer. For example, with reference to FIG. 6, buffer 109 may provide or be accessed to provide buffer fill signal 603, which may indicate the buffer fill level and/or a number of physically buffered samples.

Returning to FIG. 7, process 700 may continue at operation 705, "Generate Conversion Ratio", where a conversion ratio may be generated based on the number of virtually buffered samples and the buffer fill level and/or a number of physically buffered samples. For example, with reference to FIG. 6, closed loop controller 602 may generate conversion ratio 604 based on the number of virtually buffered samples (e.g., number of virtually buffered samples 126) and the buffer fill level and/or a number of physically buffered samples (e.g., via buffer fill signal 603). Closed loop controller 602 may generate conversion ratio 604 based on the number of virtually buffered samples and the buffer fill level and/or a number of physically buffered samples using any suitable technique or techniques. For example, closed loop controller 602 may determine a number of overall samples as a sum of the number of virtually buffered samples and the number of physically buffered samples (e.g., within buffer 109). For example, closed loop controller 602 may determine a number of overall samples as shown with respect to Equation (5):

$$N_{overall\ samples} = N_{virtually\ buffered\ samples} + N_{physically\ buffered\ samples} \quad (5)$$

where $N_{overall\ samples}$ may be the number of overall samples, $N_{virtually\ buffered\ samples}$ may be the number of virtually buffered samples (e.g., number of virtually buffered samples 126, as determined via Equation (1), for example), and $N_{physically\ buffered\ samples}$ may be the number of physically buffered samples (e.g., the number of samples actually in the buffer as determined via buffer fill signal 603).

Returning to FIG. 7, process 700 may continue at operation 706, "Modify Sample Rate", where a sample or sampling rate such as a capture sample rate may be modified or adjusted based on the conversion ratio generated at operation 705. The sample rate may be modified using any suitable technique or techniques. For example, with reference to FIG. 6, asynchronous sample rate converter 601 may interpolate or decimate the audio capture signal between capture driver 104 and buffer 109 based on conversion ratio 604. Although discussed herein with respect to a modification of a capture sample rate, system 600 may adjust for the discussed clock skew using any suitable timing modification between capture device 110 and playback device 111 such as a modification of a playback sample rate or the like.

Returning to FIG. 7, as shown, process 700 may end at end operation 706. For example, process 700 may provide a single sample rate modification. Process 700 may be repeated any number of times as shown via return loop 708 such as substantially continuously during the operation of audio system 600 to provide synchronization between input and output audio signals based on the sampling rate modification or control. For example, with respect to FIG. 6, closed loop controller 602 may operate continuously to compensate for any time varying clock skews by substantially continuously measuring the number of physically buffered samples (e.g., based on buffer fill signal 603) and by measuring the latency between capture thread 103 and playback thread 105 substantially continuously via latency detection module 107 and providing number of virtually buffered samples 126 substantially continuously. Thereby audio input signal 121 and audio output signal 121 may be substantially synchronized.

Figure 8:
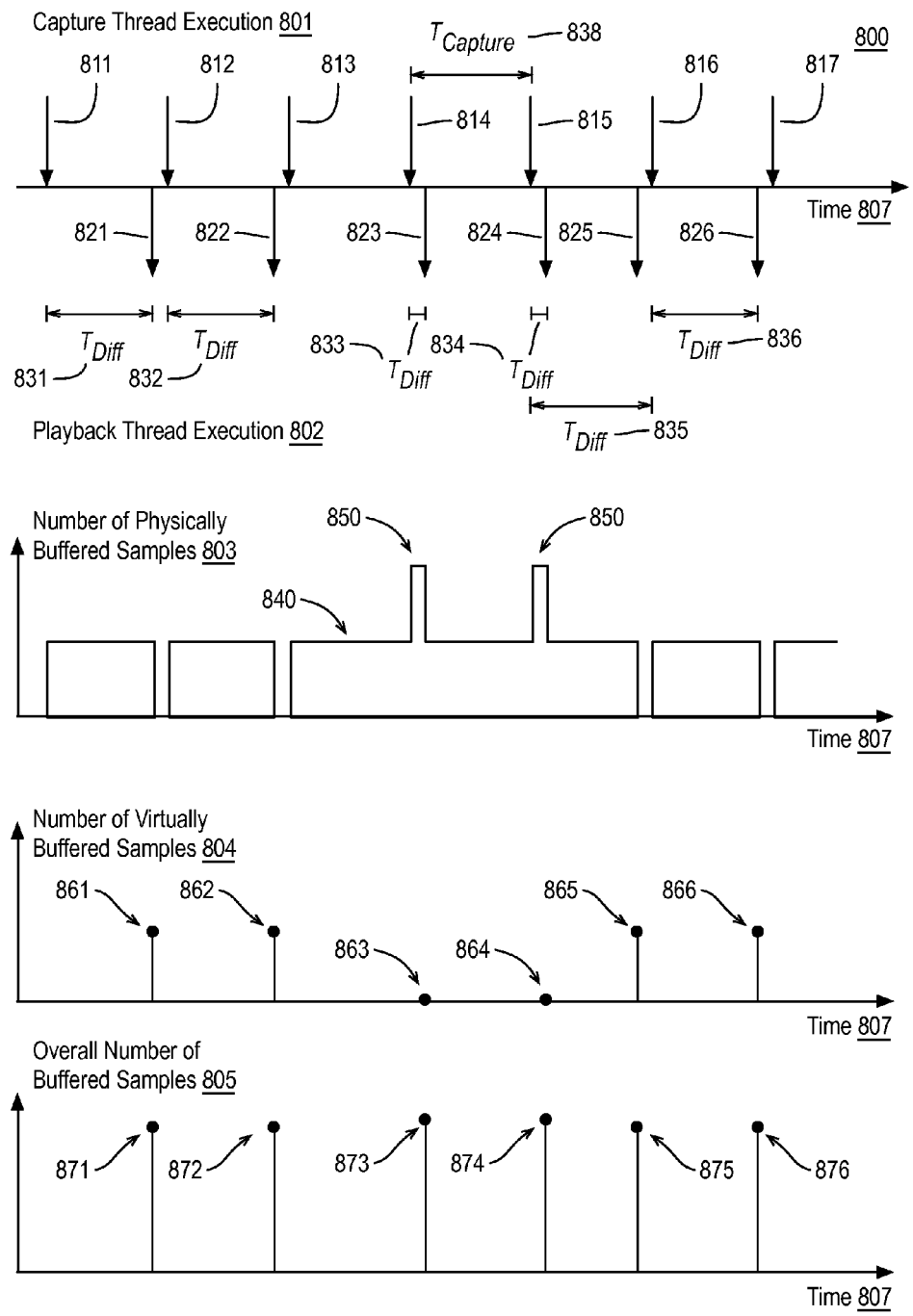
FIG. 8 illustrates an example timing diagram for an example capture thread execution and an example playback thread execution.

FIG. 8 illustrates an example timing diagram 800 for an example capture thread execution 801 and an example playback thread execution 802, arranged in accordance with at least some implementations of the present disclosure. For example, timing diagram 800 may illustrate capture thread execution 801, playback thread execution 802, number of physically buffered samples 803, a number of virtually buffered samples 804, and an overall number of buffered samples 805. As shown in FIG. 8, capture thread execution 801 may include capture operations 811-817 and playback thread execution 802 may include playback operations 821-826 performed across time 807. Furthermore, between capture operation 811 and playback operation 821 may be a latency ($T_{Diff}$) 831, between capture operation 812 and playback operation 822 may be a latency 832, between capture operation 814 and playback operation 823 may be a latency 833, between capture operation 815 and playback operation 824 may be a latency 834, between capture operation 815 and playback operation 825 may be a latency 835, and between capture operation 816 and playback operation 826 may be a latency 836. As shown in FIG. 8, if subsequent capture operations have no playback operation between them, no latency may be generated for the first capture operation (e.g., as shown with respect to capture operation 813). However, if subsequent playback operations have no capture operation between them, a latency may be generated for both based on the same initial capture operation (e.g., as shown with respect to capture operation 815 and playback operations 824, 825).

For example, capture thread execution 801 and playback thread 802 may have a jitter therebetween that causes a relatively large latency 832 to swing to a relatively small latency 833 and from relatively small latency 833 to a relatively large latency 835. Furthermore, the closeness in execution between capture operations 811-817 and playback operations 821-826 may be caused by capture driver 104 and playback driver 106 being started quick succession or any other cause of alignment. For example, the relatively large latency 832 (e.g., close to a capture time 838 of capture execution thread 802) may, due to jitter or the like be longer than the capture time 838 of capture execution thread 802 at particular operations such as at playback operation 823 being after capture operation 814 and the like. Furthermore, jitter or the like may cause playback operation 825 to precede capture operation 816 and so on.

FIG. 8 also illustrates number of physically buffered samples 803 across time 807. As shown, without undesirable jitter, number of physically buffered samples 803 may alternate substantially routinely from a zero value to a level 840 associated with a particular number of samples such as one sample or the like. However, as shown, at particular times such as times associated with playback operation 823 being after capture operation 814, number of physically buffered samples 803 may rise to a level 850 from level 840 due to jitter or the like. For example, if the closed loop control system as discussed herein operated only based on number of physically buffered samples 803 (e.g., based on a buffer fill level), a large amount of noise may be provided in the control signal causing undesirable swings in sampling rates and a lack of synchronization between input and output audio signals. However, the discussed techniques of using overall number of buffered samples 805 (e.g., a sum of number of physically buffered samples 803 and number of virtually buffered samples 804) may provide smoothing, even in contexts of jitter, for control of clock skew and synchronization between input and output audio signals.

For example, FIG. 8 illustrates number of virtually buffered samples 804 over time 807. As shown, number of virtually buffered samples 804 may include samples 861-866 associated with latencies 831-836. For example, each of samples 861-866 may be generated or determined based on latencies 831-836 and a sample rate as discussed with respect to Equation (1). As shown, samples 861-866 may be proportional to latencies 831-836. For example, samples 861, 862, 865, and 866 may be substantially large based on latencies 831, 832, 835, and 836 and samples 863 and 864 may be substantially small based on latencies 833 and 834.

Furthermore, as shown via overall number of buffered samples 805, a combination (e.g., a sum of number of physically buffered samples 803 and number of virtually buffered samples 804) may provide a substantially smooth set of overall samples 871-876. For example, sample 871 may correspond to level 840 of number of physically buffered samples 803 summed with sample 861, sample 872 may correspond to level 840 of number of physically buffered samples 803 summed with sample 862, sample 873 may correspond to level 850 of number of physically buffered samples 803 summed with sample 863, sample 874 may correspond to level 850 of number of physically buffered samples 803 summed with sample 864, sample 875 may correspond to level 840 of number of physically buffered samples 803 summed with sample 865, and sample 876 may correspond to level 840 of number of physically buffered samples 803 summed with sample 866. In the illustrated example, overall samples 873 and 874 may be insignificantly larger than overall samples 871, 872, 875, and 876 and, as discussed, a closed loop controller may compensate for a clock skew via a conversion ratio based on such data. In this context, the closed loop controller and an asynchronous sample rate converter may provide smooth and robust clock skew compensation based on overall samples 871-876. Furthermore, the smoothness and lack of jitter associated with such overall samples 871-876 for clock skew compensation may be contrasted with the large swings in the signals of physically buffered samples 803 or samples 861-866.

Figure 9:
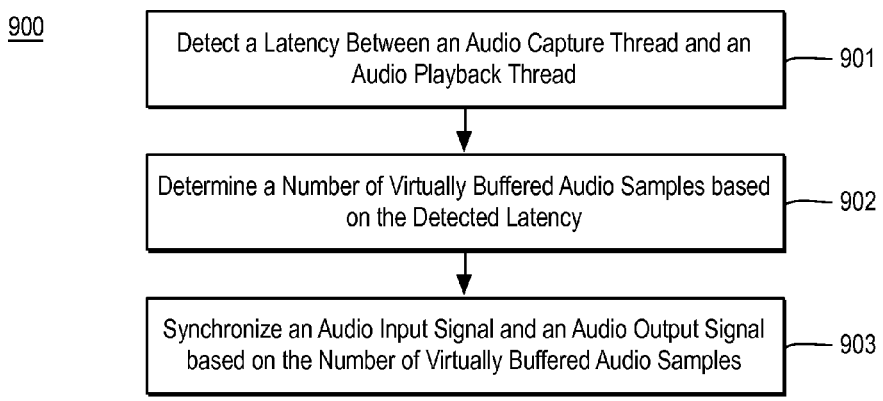
FIG. 9 is a flow diagram illustrating an example process for performing audio signal synchronization.

FIG. 9 is a flow diagram illustrating an example process 900 for performing audio signal synchronization, arranged in accordance with at least some implementations of the present disclosure. Process 900 may include one or more operations 901-903 as illustrated in FIG. 9. Process 900 may form at least part of an audio signal synchronization process. By way of non-limiting example, process 900 may form at least part of an audio signal synchronization process as performed by audio system 100, audio system 300, or audio system 600 as discussed herein. Furthermore, process 900 will be described herein with reference to system 1000 of FIG. 10.

Figure 10:
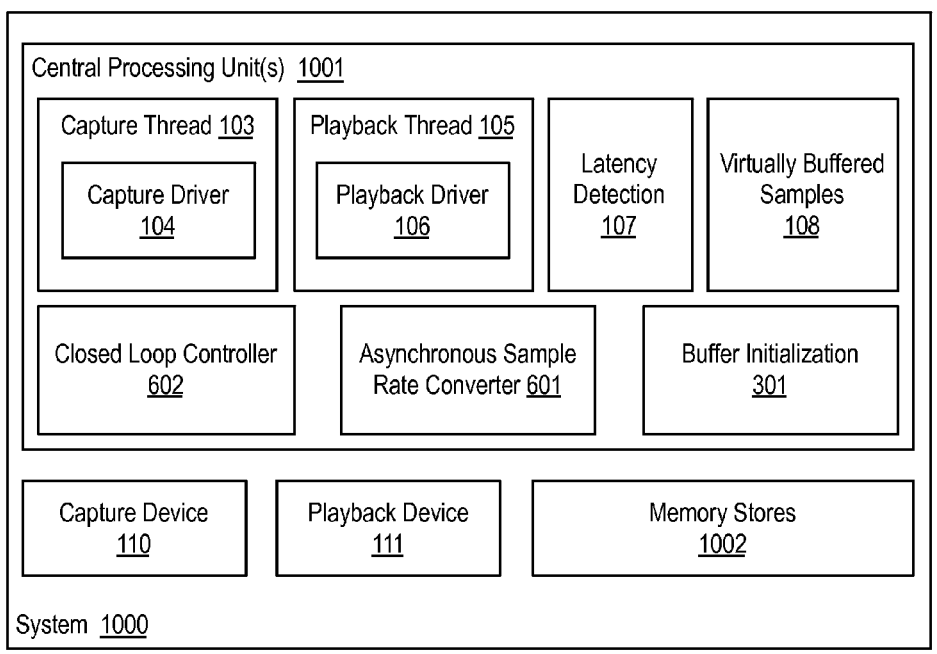
FIG. 10 is an illustrative diagram of an example system for performing audio signal synchronization.

FIG. 10 is an illustrative diagram of an example system 1000 for performing audio signal synchronization, arranged in accordance with at least some implementations of the present disclosure. As shown in FIG. 10, system 1000 may include one or more central processing units (CPU) 1001, capture device 110, playback device 111, and memory stores 1002. Also as shown, CPU 1001 may include capture thread 103, capture driver 104, playback thread 105, playback driver 106, latency detection module 107, virtually buffered samples module 108, closed loop controller 602, asynchronous sample rate converter 601, and/or buffer initialization module 301. In the example of system 1100, memory stores 1002 may store audio or related data or content such as audio input signal data, audio output signal data, function calls, numbers of virtually buffered samples, numbers of physically buffered samples, numbers of overall buffered samples, audio samples, audio data words, audios data bits, latency data, target latency data, sample rates, buffer fill signal data, conversion ratios, capture rate signal data, and/or any other data as discussed herein.

As shown, in some examples, capture thread 103, capture driver 104, playback thread 105, playback driver 106, latency detection module 107, virtually buffered samples module 108, closed loop controller 602, asynchronous sample rate converter 601, and/or buffer initialization module 301 may be implemented via central processing units 1001. In other examples, one or more or portions of capture thread 103, capture driver 104, playback thread 105, playback driver 106, latency detection module 107, virtually buffered samples module 108, closed loop controller 602, asynchronous sample rate converter 601, and/or buffer initialization module 301 may be implemented via an audio signal processor, dedicated hardware, fixed function circuitry, an execution unit or units, or the like. Fixed function circuitry may include, for example, dedicated logic or circuitry and may provide a set of fixed function entry points that may map to the dedicated logic for a fixed purpose or function. An execution (EU) may include, for example, programmable logic or circuitry such as a logic core or cores that may provide a wide array of programmable logic functions.

Central processing units 1001 may include any number and type of processing units or modules that may provide control and other high level functions for system 1000 and/or provide any operations as discussed herein. Memory stores 1002 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1002 may be implemented by cache memory.

Returning to discussion of FIG. 9, process 900 may begin at operation 901, "Detect a Latency Between an Audio Capture Thread and an Audio Playback Thread", where a latency between an audio capture thread and an audio playback thread may be detected. For example, latency detection module 107 as implemented via central processing units 1001 may detect the latency using any suitable technique or techniques. For example, the latency may be detected based on analysis of capture thread 103 and playback thread 105. In some examples, detecting the latency between the audio capture thread and the audio playback thread may include comparing a capture thread function call time stamp and a playback thread function call time stamp. As discussed, the audio system performing process 900 (e.g., system 1000) may include any suitable audio system such as a block-based multi-threaded audio system or the like. For example, system 1000 may include a block-based multi-threaded operating system. In some examples, the latency provided at operation may be based on a single latency detection or measurement and, in other examples, the latency may be a median of multiple detected latencies (e.g., a median of 15 detected latencies or the like).

Process 900 may continue at operation 902, "Determine a Number of Virtually buffered audio samples based on the Detected Latency", where a number of virtually buffered audio samples may be determined based on the latency between the audio capture thread and the audio playback thread. For example, virtually buffered samples module 108 as implemented via central processing units 1001 may determine the number of virtually buffered audio samples using any suitable technique or techniques. In some examples, the number of virtually buffered audio samples may be based on the latency between the audio capture thread and the audio playback thread and a sample rate associated with the audio capture thread. For example, the number of virtually buffered audio samples may be determined as discussed with respect to Equation (1).

Process 900 may continue at operation 903, "Synchronize an Audio Input Signal and an Audio Output Signal based on the Number of Virtually buffered Audio Samples", where an audio input signal and an audio output signal may be synchronized based on the number of virtually buffered audio samples. The audio input signal and audio output signal may be synchronized based on the number of virtually buffered audio samples using any suitable technique or techniques.

For example, the audio input signal and the audio output signal may be synchronized by initializing a buffer associated with the audio capture thread and the audio playback thread based on a difference between a target latency between audio input signal 121 and audio output signal 122 and the latency between the audio capture thread and the audio playback thread. In some examples, capture driver 104 and playback driver 106 may be initialized and the latency detection at operation 901 may be subsequent to such initializations. As discussed herein, capture driver 104 may be associated with capture thread 103 and capture device 110 and playback driver 106 may be associated with playback thread 105 and playback device 111. Furthermore, capture device 110 and playback device 111 may operate based on a shared audio clock as discussed with respect to FIG. 3.

For example, central processing units 1001 and/or memory stores 1002 may implement a ring buffer or a FIFO buffer or the like and buffer initialization module 301 as implemented via central processing units 1001 may determine the difference based on the target (e.g., known) latency for system 1000. For example, the difference may be associated with a time lag or number of samples or the like associated with bringing capture thread 103 and playback thread 105 from the latency (e.g., measured detected latency) determined at operation 901 to the target latency. For example, the buffer may be initialized with a number of physically buffered samples associated with or corresponding to the difference between the target latency and the detected latency.

In other examples, the audio input signal and the audio output signal may be synchronized by generating a conversion ratio for asynchronous sample rate conversion based on the number of virtually buffered audio samples determined at operation 902. For example, closed loop controller 602 as implemented via central processing units 1001 may generate the conversion ratio and asynchronous sample rate converter 601 may execute at least one of an interpolation or a decimation on an audio capture signal based on the conversion ratio. In some examples, the conversion ratio for asynchronous sample rate conversion may be based on a sum of the number of virtually buffered audio samples and a buffer fill level of a buffer associated with the audio capture thread and the audio playback thread. For example, the buffer (e.g., a ring buffer or a FIFO buffer or the like) may be implemented via central processing units 1001 and/or memory stores 1002. For example, the sum may be a sum of the number of virtually buffered audio samples determined at operation 902 and a number of physically buffered audio samples determined based on the status of the buffer. Furthermore, as discussed capture driver 104 may be associated with capture thread 103 and capture device 110 and playback driver 106 may be associated with playback thread 105 and playback device 111. In some examples, capture device 110 and playback device 111 may operate based on independent audio clocks (e.g., first and second audio clocks, input and output audio clocks, or the like) as discussed with respect to FIG. 6.

Process 900 may be repeated any number of times either in series or in parallel to perform audio signal synchronization and/or jitter compensation. As discussed, process 900 may provide for robust and jitter resistant synchronization between an audio input signal and an audio output signal. Furthermore, as discussed, in some examples, operation 903 of process 900 may include initializing a buffer associated with the audio capture thread and the audio playback thread based on a difference between a target latency between the audio capture thread and the audio playback thread and the latency between the audio capture thread and the audio playback thread. In such examples, system 1000 may include buffer initialization module 301 and system 1000 may optionally not include closed loop controller 602 and/or asynchronous sample rate converter 601. In other examples, operation 903 of process 900 may include generating a conversion ratio for asynchronous sample rate conversion based on the number of virtually buffered audio samples. In such examples, system 1000 may include closed loop controller 602 and asynchronous sample rate converter 601 and system 1000 may optionally not include buffer initialization module 301.

Various components of the systems described herein may be implemented in software, firmware, and/or hardware and/or any combination thereof. For example, various components of systems 100, 300, 600, 1000, or 1100 may be provided, at least in part, by hardware of a computing System-on-a-Chip (SoC) such as may be found in a computing system such as, for example, an audio system. Those skilled in the art may recognize that systems described herein may include additional components that have not been depicted in the corresponding figures. For example, the systems discussed herein may include additional components such as additional audio hardware, audio cards, speakers, microphones, audio interfaces or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100, 300, 600, 1000, or 1100, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
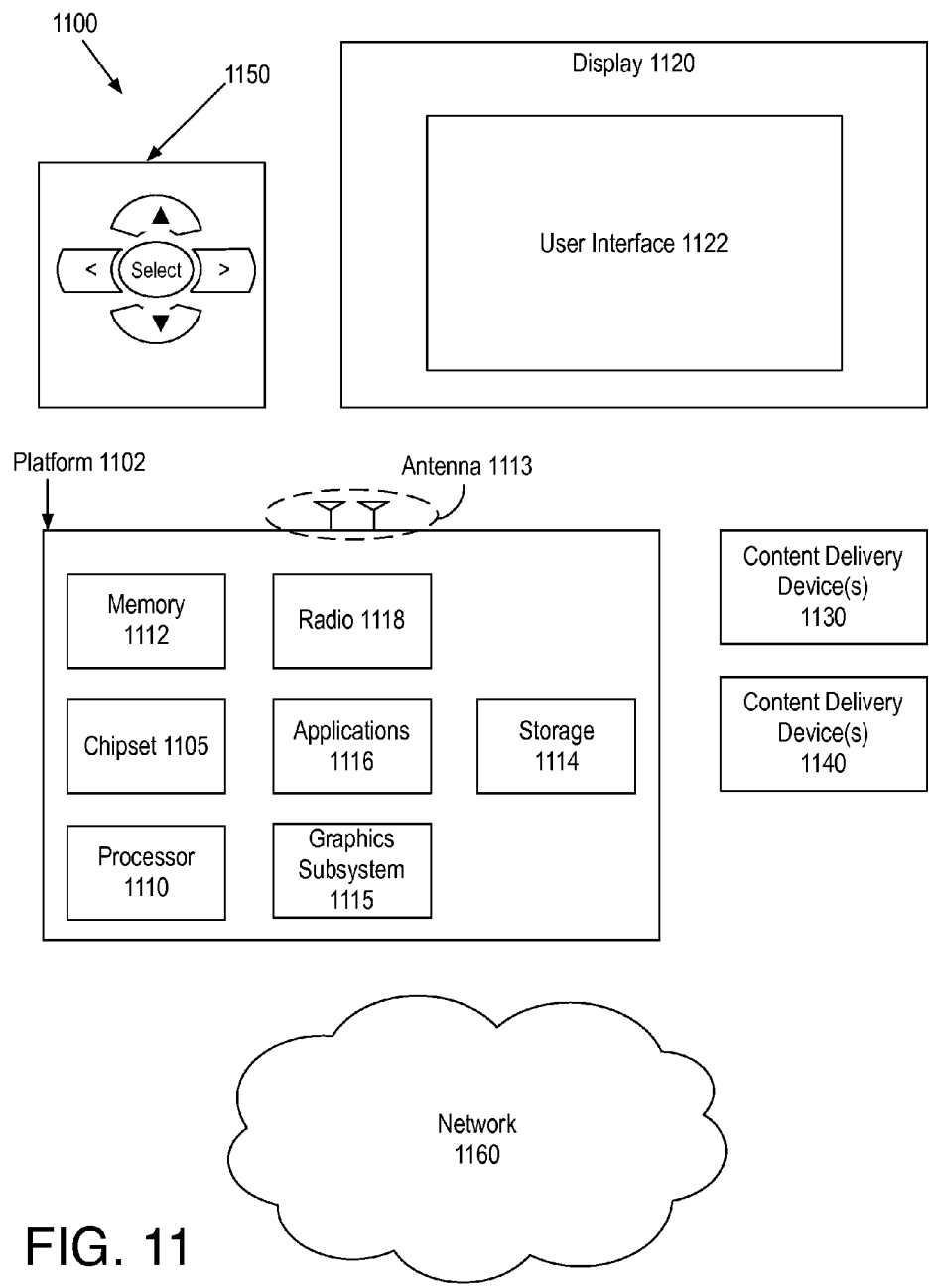
FIG. 11 is an illustrative diagram of an example system, all arranged in accordance with at least some implementations of the present disclosure.

FIG. 11 is an illustrative diagram of an example system 1100, arranged in accordance with at least some implementations of the present disclosure. In various implementations, system 1100 may be an audio system or a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to an optional display 1120. Platform 1102 may receive content from a content device such as content services device(s) 1130 or content delivery device(s) 1140 or other similar content sources. An optional navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The audio processing techniques described herein may be implemented in various hardware architectures. For example, audio processing functionality may be integrated within a chipset. Alternatively, a discrete audio and/or media processor may be used. As still another implementation, the audio processing functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for performing synchronization for an audio system comprises detecting a latency between an audio capture thread and an audio playback thread, determining a number of virtually buffered audio samples based on the latency between the audio capture thread and the audio playback thread, and synchronizing an audio input signal and an audio output signal based on the number of virtually buffered audio samples.

Further to the first embodiments, detecting the latency between the audio capture thread and the audio playback thread comprises comparing a capture thread function call time stamp and a playback thread function call time stamp.

Further to the first embodiments, the number of virtually buffered audio samples is based on the latency between the audio capture thread and the audio playback thread and a sample rate associated with the audio capture thread.

Further to the first embodiments, the audio system comprises a block-based multi-threaded operating system.

Further to the first embodiments, the method further comprises initializing a buffer associated with the audio capture thread and the audio playback thread based on a difference between a target latency between the audio input signal and the audio output signal and the latency between the audio capture thread and the audio playback thread.

Further to the first embodiments, the method further comprises initializing a buffer associated with the audio capture thread and the audio playback thread based on a difference between a target latency between the audio input signal and the audio output signal and the latency between the audio capture thread and the audio playback thread, wherein the buffer comprises at least one of a ring buffer or a first in, first out (FIFO) buffer, and wherein initializing the buffer based on the difference comprises initializing the buffer with a number of physically buffered samples corresponding to the difference.

Further to the first embodiments, the method further comprises initializing a buffer associated with the audio capture thread and the audio playback thread based on a difference between a target latency between the audio input signal and the audio output signal and the latency between the audio capture thread and the audio playback thread, wherein the latency between the audio capture thread and the audio playback thread is based on multiple sample latencies between the audio capture thread and the audio playback thread.

Further to the first embodiments, the method further comprises initializing a buffer associated with the audio capture thread and the audio playback thread based on a difference between a target latency between the audio input signal and the audio output signal and the latency between the audio capture thread and the audio playback thread and initializing, prior to detecting the latency between the audio capture thread and the audio playback thread, a capture driver associated with the audio capture thread and a playback driver associated with the audio playback thread.

Further to the first embodiments, the method further comprises initializing a buffer associated with the audio capture thread and the audio playback thread based on a difference between a target latency between the audio input signal and the audio output signal and the latency between the audio capture thread and the audio playback thread and initializing, prior to detecting the latency between the audio capture thread and the audio playback thread, a capture driver associated with the audio capture thread and a playback driver associated with the audio playback thread, wherein the capture driver is associated with a capture device and the playback driver is associated with a playback device, and wherein the capture device and the playback device operate based on a shared audio clock Further to the first embodiments, the method further comprises generating a conversion ratio for asynchronous sample rate conversion based at least in part on the number of virtually buffered audio samples.

Further to the first embodiments, the method further comprises generating a conversion ratio for asynchronous sample rate conversion based at least in part on the number of virtually buffered audio samples, wherein the conversion ratio for asynchronous sample rate conversion is based on a sum of the number of virtually buffered audio samples and a buffer fill level of a buffer associated with the audio capture thread and the audio playback thread.

Further to the first embodiments, the method further comprises generating a conversion ratio for asynchronous sample rate conversion based at least in part on the number of virtually buffered audio samples and executing at least one of an interpolation or a decimation on an audio capture signal based on the conversion ratio.

Further to the first embodiments, the method further comprises generating a conversion ratio for asynchronous sample rate conversion based at least in part on the number of virtually buffered audio samples, wherein the capture driver is associated with a capture device and the playback driver is associated with a playback device, and wherein the capture device operates based on a first audio clock and the playback driver operate based on a second audio clock independent of the first audio clock.

In one or more second embodiments, an audio system comprises a buffer configured to store audio data and a central processing unit coupled to the buffer, the central processing unit to detect a latency between an audio capture thread and an audio playback thread, determine a number of virtually buffered audio samples based on the latency between the audio capture thread and the audio playback thread, and synchronize an audio input signal and an audio output signal based on the number of virtually buffered audio samples.

Further to the second embodiments, the central processing unit to detect the latency between the audio capture thread and the audio playback thread comprises the central processing unit to compare a capture thread function call time stamp and a playback thread function call time stamp.

Further to the second embodiments, the number of virtually buffered audio samples is based on the latency between the audio capture thread and the audio playback thread and a sample rate associated with the audio capture thread.

Further to the second embodiments, the audio system comprises a block-based multi-threaded audio system.

Further to the second embodiments, the central processing unit is further to initialize the buffer based on a difference between a target latency between the audio input signal and the audio output signal and the latency between the audio capture thread and the audio playback thread.

Further to the second embodiments, the central processing unit is further to initialize the buffer based on a difference between a target latency between the audio input signal and the audio output signal and the latency between the audio capture thread and the audio playback thread, wherein the buffer comprises at least one of a ring buffer or a first in, first out (FIFO) buffer, and wherein the central processing unit to initialize the buffer based on the difference comprises the central processing unit to initialize the buffer with a number of physical buffered samples corresponding to the difference.

Further to the second embodiments, the central processing unit is further to initialize the buffer based on a difference between a target latency between the audio input signal and the audio output signal and the latency between the audio capture thread and the audio playback thread, wherein the latency between the audio capture thread and the audio playback thread is based on multiple sample latencies between the audio capture thread and the audio playback thread.

Further to the second embodiments, the central processing unit is further to initialize the buffer based on a difference between a target latency between the audio input signal and the audio output signal and the latency between the audio capture thread and the audio playback thread, wherein the central processing unit is further to initialize, prior to detection of the latency between the audio capture thread and the audio playback thread, a capture driver associated with the audio capture thread and a playback driver associated with the audio playback thread.

Further to the second embodiments, the central processing unit is further to initialize the buffer based on a difference between a target latency between the audio input signal and the audio output signal and the latency between the audio capture thread and the audio playback thread, wherein the central processing unit is further to initialize, prior to detection of the latency between the audio capture thread and the audio playback thread, a capture driver associated with the audio capture thread and a playback driver associated with the audio playback thread, and the audio system further comprises a capture device coupled to the central processing unit, wherein the capture driver is associated with the capture device a playback device coupled to the central processing unit, wherein the playback driver is associated with the playback device, and wherein the capture device and the playback device operate based on a shared audio clock.

Further to the second embodiments, the central processing unit is further to generate a conversion ratio for asynchronous sample rate conversion based at least in part on the number of virtually buffered audio samples.

Further to the second embodiments, the central processing unit is further to generate a conversion ratio for asynchronous sample rate conversion based at least in part on the number of virtually buffered audio samples, wherein the conversion ratio for asynchronous sample rate conversion is based on a sum of the number of virtually buffered audio samples and a buffer fill level of a buffer associated with the audio capture thread and the audio playback thread.

Further to the second embodiments, the central processing unit is further to generate a conversion ratio for asynchronous sample rate conversion based at least in part on the number of virtually buffered audio samples, wherein the central processing unit is further to execute at least one of an interpolation or a decimation on an audio capture signal based on the conversion ratio.

Further to the second embodiments, the central processing unit is further to generate a conversion ratio for asynchronous sample rate conversion based at least in part on the number of virtually buffered audio samples and the audio system further comprises a capture device coupled to the central processing unit, wherein the capture device is to operate based on a first audio clock and a playback device coupled to the central processing unit, wherein the playback device is to operate based on a second audio clock independent of the first audio clock.

In one or more third embodiments, an audio system comprises means for detecting a latency between an audio capture thread and an audio playback thread, means for determining a number of virtually buffered audio samples based on the latency between the audio capture thread and the audio playback thread, and means for synchronizing an audio input signal and an audio output signal based on the number of virtually buffered audio samples.

Further to the third embodiments, the means for detecting the latency between the audio capture thread and the audio playback thread comprise means for comparing a capture thread function call time stamp and a playback thread function call time stamp.

Further to the third embodiments, the number of virtually buffered audio samples is based on the latency between the audio capture thread and the audio playback thread and a sample rate associated with the audio capture thread.

Further to the third embodiments, the audio system comprises a block-based multi-threaded operating system.

Further to the third embodiments, the audio system further comprises means for initializing a buffer associated with the audio capture thread and the audio playback thread based on a difference between a target latency between the audio input signal and the audio output signal and the latency between the audio capture thread and the audio playback thread.

Further to the third embodiments, the audio system further comprises means for initializing a buffer associated with the audio capture thread and the audio playback thread based on a difference between a target latency between the audio input signal and the audio output signal and the latency between the audio capture thread and the audio playback thread, wherein the buffer comprises at least one of a ring buffer or a first in, first out (FIFO) buffer, and wherein the means for initializing the buffer based on the difference comprise means for initializing the buffer with a number of physically buffered samples corresponding to the difference.

Further to the third embodiments, the audio system further comprises means for initializing a buffer associated with the audio capture thread and the audio playback thread based on a difference between a target latency between the audio input signal and the audio output signal and the latency between the audio capture thread and the audio playback thread, wherein the latency between the audio capture thread and the audio playback thread is based on multiple sample latencies between the audio capture thread and the audio playback thread.

Further to the third embodiments, the audio system further comprises means for initializing a buffer associated with the audio capture thread and the audio playback thread based on a difference between a target latency between the audio input signal and the audio output signal and the latency between the audio capture thread and the audio playback thread and means for initializing a capture driver associated with the audio capture thread and a playback driver associated with the audio playback thread.

Further to the third embodiments, the audio system further comprises means for initializing a buffer associated with the audio capture thread and the audio playback thread based on a difference between a target latency between the audio input signal and the audio output signal and the latency between the audio capture thread and the audio playback thread and means for initializing a capture driver associated with the audio capture thread and a playback driver associated with the audio playback thread, wherein the capture driver is associated with a capture device and the playback driver is associated with a playback device, and wherein the capture device and the playback device operate based on a shared audio clock.

Further to the third embodiments, the audio system further comprises means for generating a conversion ratio for asynchronous sample rate conversion based at least in part on the number of virtually buffered audio samples.

Further to the third embodiments, the audio system further comprises means for generating a conversion ratio for asynchronous sample rate conversion based at least in part on the number of virtually buffered audio samples, wherein the conversion ratio for asynchronous sample rate conversion is based on a sum of the number of virtually buffered audio samples and a buffer fill level of a buffer associated with the audio capture thread and the audio playback thread.

Further to the third embodiments, the audio system further comprises means for generating a conversion ratio for asynchronous sample rate conversion based at least in part on the number of virtually buffered audio samples and means for executing at least one of an interpolation or a decimation on an audio capture signal based on the conversion ratio.

Further to the third embodiments, the audio system further comprises means for generating a conversion ratio for asynchronous sample rate conversion based at least in part on the number of virtually buffered audio samples, wherein the capture driver is associated with a capture device and the playback driver is associated with a playback device, and wherein the capture device operates based on a first audio clock and the playback driver operate based on a second audio clock independent of the first audio clock.

In one or more fourth embodiments, at least one machine readable medium comprises a plurality of instructions that, in response to being executed on a device, cause the device to perform audio signal synchronization by detecting a latency between an audio capture thread and an audio playback thread, determining a number of virtually buffered audio samples based on the latency between the audio capture thread and the audio playback thread, and synchronizing an audio input signal and an audio output signal based on the number of virtually buffered audio samples.

Further to the fourth embodiments, the machine readable medium comprises further instructions that, in response to being executed on the device, cause the device to perform audio signal synchronization by initializing a buffer associated with the audio capture thread and the audio playback thread based on a difference between a target latency between the audio input signal and the audio output signal and the latency between the audio capture thread and the audio playback thread.

Further to the fourth embodiments, the machine readable medium comprises further instructions that, in response to being executed on the device, cause the device to perform audio signal synchronization by generating a conversion ratio for asynchronous sample rate conversion based at least in part on the number of virtually buffered audio samples.

Further to the fourth embodiments, the conversion ratio for asynchronous sample rate conversion is based on a sum of the number of virtually buffered audio samples and a buffer fill level of a buffer associated with the audio capture thread and the audio playback thread.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for performing synchronization for an audio system comprising:
   detecting an actual latency between an audio capture thread and an audio playback thread determined by using a time measurement that comprises comparing timestamps of the two threads while receiving an audio input signal and transmitting an audio output signal;
   determining a number of virtually buffered audio samples based on the actual latency between the audio capture thread and the audio playback thread and a sample rate, the number of virtually buffered audio samples free from association with specific individual physical samples stored in a buffer used to store samples from the audio capture thread and to be used by the audio playback thread;

determining a number of physically buffered samples that are located in the buffer;
determining a number of overall samples by summing the number of virtually buffered audio samples and the number of physically buffered samples;
modifying the sample rate by using the number of overall samples; and
synchronizing an audio input signal and an audio output signal based, at least in part, on the number of virtually buffered audio samples.

2. The method of claim 1, wherein detecting the latency between the audio capture thread and the audio playback thread comprises comparing a capture thread function call time stamp and a playback thread function call time stamp.

3. The method of claim 1, wherein the sample rate is associated with the audio capture thread.

4. The method of claim 1, wherein the audio system comprises a block-based multi-threaded operating system.

5. The method of claim 1, further comprising:
initializing the buffer associated with the audio capture thread and the audio playback thread based on a difference between a target latency between the audio input signal and the audio output signal and the latency between the audio capture thread and the audio playback thread.

6. The method of claim 5, wherein the buffer comprises at least one of a ring buffer or a first in, first out (FIFO) buffer, and wherein initializing the buffer based on the difference comprises initializing the buffer with a number of physically buffered samples corresponding to the difference.

7. The method of claim 5, wherein the latency between the audio capture thread and the audio playback thread is based on multiple sample latencies between the audio capture thread and the audio playback thread.

8. The method of claim 5, further comprising:
initializing, prior to detecting the latency between the audio capture thread and the audio playback thread, a capture driver associated with the audio capture thread and a playback driver associated with the audio playback thread.

9. The method of claim 8, wherein the capture driver is associated with a capture device and the playback driver is associated with a playback device, and wherein the capture device and the playback device operate based on a shared audio clock.

10. The method of claim 1, further comprising:
generating a conversion ratio for asynchronous sample rate conversion based at least in part on the number of overall samples; and
modifying the sample rate by using the conversion ratio.

11. The method of claim 10, comprising repeating the generation of the conversion ratio for asynchronous sample rate conversion as the method is performed continuously during operations to receive the audio input signal and transmit the audio output signal.

12. The method of claim 10, further comprising:
executing at least one of an interpolation or a decimation on an audio capture signal based on the conversion ratio to modify the sample rate of the audio capture signal.

13. The method of claim 10, wherein a capture driver is associated with a capture device and a playback driver is associated with a playback device, and wherein the capture device operates based on a first audio clock and the playback driver operates based on a second audio clock independent of the first audio clock.

14. An audio system comprising:
a buffer configured to store audio data; and
a central processing unit coupled to the buffer, the central processing unit to operate by:
detecting an actual latency between an audio capture thread and an audio playback thread determined by using a time measurement that comprises comparing timestamps of the two threads while receiving an audio input signal and transmitting an audio output signal;
determining a number of virtually buffered audio samples based on the actual latency between the audio capture thread and the audio playback thread and a sample rate associated with the audio capture thread, the number of virtually buffered audio samples free from association with specific individual physical samples stored in a buffer used to store samples from the audio capture thread and to be used by the audio playback thread;
determining a number of physically buffered samples that are located in the buffer;
determining a number of overall samples by summing the number of virtually buffered audio samples and the number of physically buffered samples;
modifying the sample rate by using the number of overall samples; and
synchronizing an audio input signal and an audio output signal based, at least in part, on the number of virtually buffered audio samples.

15. The audio system of claim 14, wherein the central processing unit is further to initialize the buffer based on a difference between a target latency between the audio input signal and the audio output signal and the latency between the audio capture thread and the audio playback thread.

16. The audio system of claim 15, wherein the buffer comprises at least one of a ring buffer or a first in, first out (FIFO) buffer, and wherein the central processing unit to initialize the buffer based on the difference comprises the central processing unit to initialize the buffer with a number of physically buffered samples corresponding to the difference.

17. The audio system of claim 15, wherein the central processing unit is further to initialize, prior to detection of the latency between the audio capture thread and the audio playback thread, a capture driver associated with the audio capture thread and a playback driver associated with the audio playback thread.

18. The audio system of claim 17, further comprising:
a capture device coupled to the central processing unit, wherein the capture driver is associated with the capture device; and
a playback device coupled to the central processing unit, wherein the playback driver is associated with the playback device, and wherein the capture device and the playback device operate based on a shared audio clock.

19. The audio system of claim 14, wherein the central processing unit is further to generate a conversion ratio for asynchronous sample rate conversion based at least in part on the number of overall samples; and
modify the sample rate by using the conversion ratio.

20. The audio system of claim 19, wherein the central processing unit is further to:
repeat the generation of the conversion ratio for asynchronous sample rate conversion as the method is performed continuously during operations to receive the audio input signal and transmit the audio output signal, and execute at least one of an interpolation or a decimation on an audio capture signal based on the conversion ratio to modify the sample rate of the audio capture signal.

21. The audio system of claim 19, further comprising:

a capture device coupled to the central processing unit, wherein the capture device is to operate based on a first audio clock; and a playback device coupled to the central processing unit, wherein the playback device is to operate based on a second audio clock independent of the first audio clock.

22. At least one non-transitory machine readable medium comprising a plurality of instructions that, in response to being executed on a device, cause the device to perform audio signal synchronization by:

detecting an actual latency between an audio capture thread and an audio playback thread determined by using a time measurement that comprises comparing timestamps of the two threads while receiving an audio input signal and transmitting an audio output signal;

determining a number of virtually buffered audio samples based on the actual latency between the audio capture thread and the audio playback thread and a sample rate associated with the audio capture thread, the number of virtually buffered audio samples free from association with specific individual physical samples stored in a buffer used to store samples from the audio capture thread and to be used by the audio playback thread;

determining a number of physically buffered samples that are located in the buffer;

determining a number of overall samples by summing the number of virtually buffered audio samples and the number of physically buffered samples;

modifying the sample rate by using the number of overall samples; and synchronizing an audio input signal and an audio output signal based, at least in part, on the number of virtually buffered audio samples.

23. The machine readable medium of claim 22, the machine readable medium comprising further instructions that, in response to being executed on the device, cause the device to perform audio signal synchronization by:

initializing a buffer associated with the audio capture thread and the audio playback thread based on a difference between a target latency between the audio input signal and the audio output signal and the latency between the audio capture thread and the audio playback thread.

24. The machine readable medium of claim 22, the machine readable medium comprising further instructions that, in response to being executed on the device, cause the device to perform audio signal synchronization by:

generating a conversion ratio for asynchronous sample rate conversion based at least in part on the number of overall samples; and modifying the sample rate by using the conversion ratio.

25. The machine readable medium of claim 24, wherein the machine readable medium comprising further instructions that, in response to being executed on the device, cause the device to perform audio signal synchronization by:

repeating the generation of the conversion ratio for asynchronous sample rate conversion as the method is performed continuously during operations to receive the audio input signal and transmit the audio output signal, and executing at least one of an interpolation or a decimation on an audio capture signal based on the conversion ratio to modify the sample rate of the audio capture signal.

* * * * *